US010848714B1

(12) United States Patent
Cirjan et al.

(10) Patent No.: US 10,848,714 B1
(45) Date of Patent: Nov. 24, 2020

(54) SYSTEMS AND METHODS FOR DETECTING LEAKAGE USING INERTIAL DEVICES

(71) Applicant: Viavi Solutions, Inc., San Jose, CA (US)

(72) Inventors: Ionut Silviu Cirjan, Bucharest (RO); Thomas Renken, Greenwood, IN (US)

(73) Assignee: Viavi Solutions Inc, San Jose, CA (US)

(*) Notice: Subject to any disclaimer, the term of this patent is extended or adjusted under 35 U.S.C. 154(b) by 0 days.

(21) Appl. No.: 16/418,970

(22) Filed: May 21, 2019

(51) Int. Cl.
H04N 7/173 (2011.01)
H04H 20/78 (2008.01)
H04N 21/61 (2011.01)

(52) U.S. Cl.
CPC ........ H04N 7/17309 (2013.01); H04H 20/78 (2013.01); H04N 21/6118 (2013.01); H04N 21/6168 (2013.01)

(58) Field of Classification Search
None
See application file for complete search history.

(56) References Cited

U.S. PATENT DOCUMENTS

| 9,379,829 B2* | 6/2016 | Ruth | H04B 17/354 |
| 2002/0072881 A1* | 6/2002 | Saitta | G01C 21/206 703/1 |
| 2009/0048773 A1* | 2/2009 | Jarventie | G01C 21/20 701/533 |
| 2011/0148936 A1* | 6/2011 | Bhatt | G11B 27/105 345/676 |
| 2013/0291044 A1* | 10/2013 | Zinevich | H04N 21/6118 725/111 |
| 2015/0264343 A1* | 9/2015 | Bush | H04N 21/6168 725/107 |
| 2016/0197804 A1* | 7/2016 | Zinevich | H04L 43/08 370/252 |
| 2017/0251207 A1 | 8/2017 | Bush et al. | |
| 2017/0311127 A1 | 10/2017 | Murphy et al. | |

* cited by examiner

Primary Examiner — William J Kim
(74) Attorney, Agent, or Firm — DLA Piper LLP (US)

(57) ABSTRACT

Systems and methods using inertial devices for generating reports associated with tests detecting leakage from cable network systems at subscribers' premises are disclosed.

20 Claims, 7 Drawing Sheets

SYSTEMS AND METHODS FOR DETECTING LEAKAGE USING INERTIAL DEVICES

TECHNICAL FIELD

The present disclosure relates, generally, to data-over-cable or cable network system testing and, more particularly, to systems and methods using inertial devices for generating reports associated with tests detecting leakage from cable network systems at subscribers' premises.

BACKGROUND

Most cable network systems are coaxial-based broadband access systems that may take the form of all-coax network systems, hybrid fiber coax (HFC) network systems, or RF over glass (RFOG) network systems. Cable network system designs typically use a tree-and-branch architecture that permits bi-directional data transmission, including Internet Protocol (IP) traffic between the cable system head-end and customer locations. There is a forward or downstream signal path (from the cable system head-end to the customer location) and a return or upstream signal path (from the customer location back to the cable system head-end). The upstream and the downstream signals occupy separate frequency bands. In the United States, the frequency range of the upstream band is from 5 MHz to 42 MHz, 5 MHz to 65 MHz, 5 MHz to 85 MHz, or 5 MHz to 204 MHz, while the downstream frequency band is positioned in a range above the upstream frequency band.

Customer locations may include, for example, cable network system (e.g., CATV) subscriber's premises. Typical signals coming from a CATV installation at the subscriber's premises include, for example, set top box DVR/On-Demand requests, test equipment data channels, and Internet Protocol output cable modem carriers defined by the Data Over Cable Service Interface Specification ("DOCSIS"), which is one communication standard for bidirectional data transport over a cable network system.

Egress or leakage from the cable network system results from flaws in the cable network system that provide points of ingress for noise, which can reduce the quality of service of the system. Service operators have utilized two basic types of leakage detection gear to locate such points of ingress. One type of gear utilizes a signal level meter with an antenna designed to receive signals in the cable network system band. A maintenance/service technician walks around a subscriber's premises monitoring the signal level meter to identify flaws in the wiring and network devices at the subscriber's premises.

The other type of gear is so-called "truck-mounted" units, which are mounted in vehicles that are driven along the data lines and nodes of the cable network system, generally by maintenance/service technicians, to monitor leakage along the cable network system. One example of a test procedure and associated instrumentation for locating leakage is shown and described in U.S. Patent App. Pub. No. 2017/0251207, which is incorporated herein by reference in its entirety.

SUMMARY

According to one aspect of the present disclosure, an instrument system may comprise a first instrument operable to generate inertial data and a second instrument secured to the first instrument during a leakage test. The second instrument may include a controller operable to receive inertial data from the first instrument, to analyze the inertial data, to generate a tracking report associated with the leakage test, the tracking report indicating a motion activity of the first instrument based on the inertial data, and to output the tracking report associated with the leakage test.

In some embodiments, the second instrument may further include an input/output (I/O) port, and the first instrument may be secured to the second instrument via the I/O port.

In some embodiments, the second instrument may further include a wireless port to receive the inertial data from the first instrument.

In some embodiments, the first instrument may include at least one of an accelerometer, a gyroscope, and a global positioning system (GPS) receiver.

In some embodiments, to analyze the inertial data may comprise to determine at least one of an orientation and an angular velocity of the first instrument.

In some embodiments, to analyze the inertial data may comprise to determine the motion activity of the first instrument based on at least one of the orientation and the angular velocity of the first instrument.

In some embodiments, to analyze the inertial data may comprise to determine a number of steps taken by a technician performing the leakage test during the leakage test.

In some embodiments, to analyze the inertial data may comprise to determine an activity path of a technician performing the leakage test based on the motion activity of the first instrument.

In some embodiments, the tracking report may include at least one of the inertial data, the motion activity of the first instrument, and the activity path of the technician.

In some embodiments, to generate the tracking report may comprise to generate a tracking map illustrating the activity path of the technician during the leakage test.

In some embodiments, the tracking map may include locations of the technician relative to a subscriber's premises where the leakage test is being performed.

In some embodiments, to output the tracking report may comprise to display the tracking map on a display screen of the second instrument.

In some embodiments, the controller may be further operable to detect a leakage at a subscriber's premises during the leakage test and to notify, in response to detecting the leakage, a technician to fix the leakage and repeat the leakage test.

According to another aspect of the present disclosure, a method may comprise receiving, by an instrument, inertial data from an inertial measurement device during a leakage test; analyzing, by the instrument, the inertial data; generating, by the instrument, a tracking report associated with the leakage test, the tracking report indicating a motion activity of the inertial measurement device based on the analysis of the inertial data; and outputting the tracking report associated with the leakage test.

In some embodiments, receiving the inertial data from the inertial measurement device may comprise receiving the inertial data from the inertial measurement device secured to the instrument.

In some embodiments, the inertial measurement device may be secured to the instrument via an input/output (I/O) port of the instrument.

In some embodiments, receiving the inertial data from the inertial measurement device may comprise receiving the inertial data wirelessly from the inertial measurement device.

In some embodiments, the inertial measurement device may include at least one of an accelerometer, a gyroscope, and global positioning system (GPS) receiver.

In some embodiments, the inertial data may indicate at least one of an orientation and an angular velocity of the instrument.

In some embodiments, analyzing the inertial data may comprise determining at least one of the orientation and the angular velocity of the inertial measurement device based on the inertial data.

In some embodiments, analyzing the inertial data may comprise determining the motion activity of the inertial measurement device based on at least one of the orientation and the angular velocity of the inertial measurement device.

In some embodiments, analyzing the inertial data may comprise determining a number of steps taken by a technician performing the leakage test during the leakage test.

In some embodiments, analyzing the inertial data may comprise determining an activity path of a technician performing the leakage test based on the motion activity of the inertial measurement device.

In some embodiments, the tracking report may include at least one of the inertial data, the motion activity of the first instrument, and the activity path of the technician.

In some embodiments, generating the tracking report may comprise generating a tracking map illustrating the activity path of the technician during the leakage test.

In some embodiments, the tracking map may include locations of the technician relative to a subscriber's premises where the leakage test is being performed.

In some embodiments, outputting the tracking report may comprise displaying the tracking map on a display screen of the instrument.

In some embodiments, the method may further comprise detecting, by the instrument, a leakage at a subscriber's premises during the leakage test, and notifying, in response to detecting the leakage, a technician to fix the leakage and repeat the leakage test.

BRIEF DESCRIPTION OF THE DRAWINGS

The detailed description particularly refers to the following figures, in which.

DETAILED DESCRIPTION OF THE DRAWINGS

Figure 1:
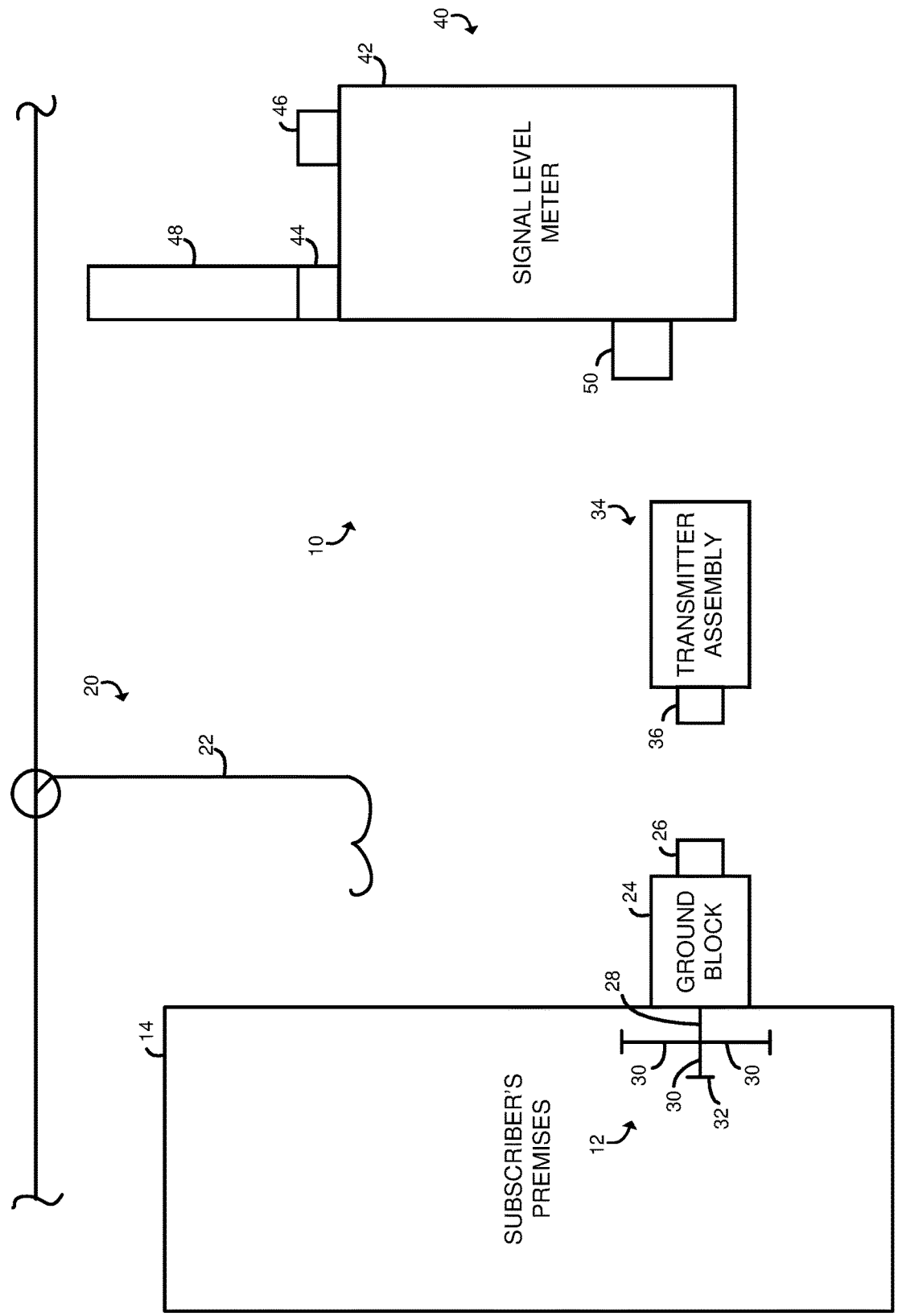
FIG. 1 is a block diagram illustrating a cable network system, a subscriber's premises, and an instrument system including a signal level meter, a ground block, and a transmitter assembly.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, an instrument system 10 for use in locating leakage in a CATV installation at a subscriber's premises 14 is shown. In the illustrative embodiment, the cable network system 20 may be connected to a subscriber's premises 14 via a data line or cable 22 to provide signals including programming material to the subscriber. The cable network system 20 includes a head end (not shown) where programming material is obtained and modulated onto appropriate carriers for distribution to a number of subscriber's premises 14. Subscribers' premises may include offices, homes, apartments, or other spaces at which CATV content is desired. The carriers may be combined for distribution downstream to subscribers over what is typically referred to as the forward path. Signals going upstream from subscribers' premises are typically routed in what is called the return path.

The cable 22 may be connected to the subscriber's premises 14 at a ground block 24. In the illustrative embodiment, the cable 22 is a coaxial cable. In other embodiment, the cable may include coaxial cable and/or optical fiber that transport the CATV signals. In some embodiments, the CATV signals are transported as radio frequencies (RF). The signals may also be transported in hybrid systems including optical transmission portions in which the RF signals are converted to light for fiber optic transmission over some portions of the signal path and as RF signals over other portions of the signal path.

The ground block 24 is illustratively coupled to the side of the subscriber's premises 14 and includes a connector 26 configured to be coupled to the cable 22. From the ground block 24, a cable 28 enters the house and connects to the CATV installation 12. The CATV installation 12 defines a "tree and branch" topology with the different branches 30 connecting various outlets 32 to the ground block 24.

The instrument system 10 for use in locating leakage in the CATV installation 12 includes a transmitter assembly 34, an antenna assembly 48 configured to receive signals generated by the transmitter assembly 34, and a signal level meter 40 configured to be coupled to the antenna assembly 48. As described in greater detail below, the instrument system 10 also includes an inertial measurement device 50. As shown in FIG. 1, the transmitter assembly 34 includes a connector 36 that is configured to be coupled to the connector 26 of the ground block 24 when the cable 22 is disconnected. For example, the transmitter assembly 34 may be operable to generate signals in a number of frequency sub-bands over a frequency range of about 100 MHz to about 1.2 GHz, and the antenna assembly 48 includes circuitry tuned to each frequency sub-band to receive signals generated by the transmitter assembly 34 over the frequency range. One example of a transmitter assembly for generating output signals is shown and described in U.S. Patent App. Pub. No. 2017/0251207, which is incorporated herein by reference in its entirety.

As described above, the connector 46 is configured to be coupled to the connector 26 of the ground block 24 to physically connect the transmitter assembly 34 with the ground block 24. With the transmitter assembly 34 connected to the ground block, a technician may energize the transmitter assembly 34 to supply the signals to the CATV installation 12 at the subscriber's premises 14 via the ground block 24.

In the illustrative embodiment, the signal level meter 40 is further connected to the inertial measurement device 50. As described above, during the leakage test, the maintenance/service technician walks around the subscriber's premises 14 with the signal level meter 40 to identify flaws in the wiring and network devices at the subscriber's premises 14. During this leakage test, the inertial measurement device 50 is configured to generate inertial data, which is used to determine a motion activity of the inertial measurement device 50. In the illustrative embodiment, based on the motion activity of the inertial measurement device 50, the signal level meter 40 is configured to determine an activity path of the maintenance/service technician and verify that the leakage test has been performed at the subscriber's premises 14, as described further below. It should be appreciated that, in some embodiments, the inertial measurement device 50 may be incorporated in, or otherwise form a portion of, the signal level meter 40.

Figure 2:
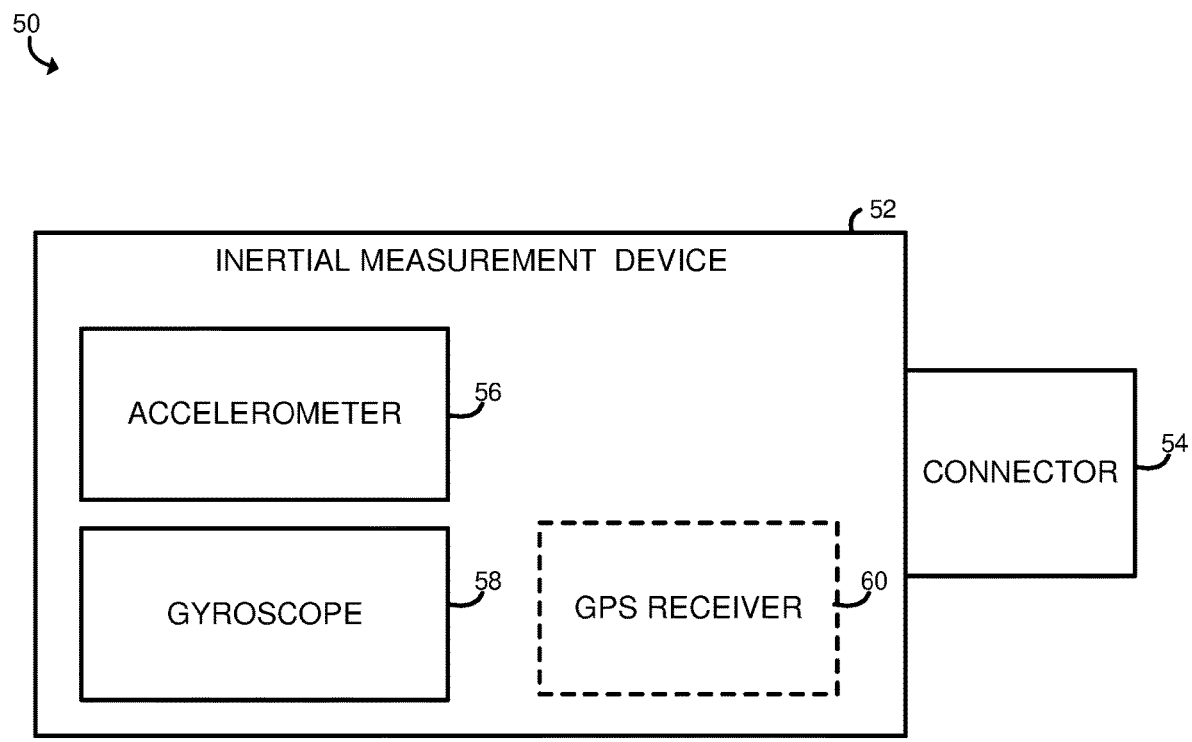
FIG. 2 is a block diagram schematic of an inertial measurement device of the signal level meter of FIG. 1.

Referring now to FIG. 2, the inertial measurement device 50 includes an outer casing 52 that houses various electronic components for generating the inertial data of inertial measurement device 50. Specifically, in the illustrative embodiment, the inertial measurement device 50 includes an accelerometer 56 and a gyroscope 58 for generating the inertial data indicative of an orientation and an angular velocity of the signal level meter 40. In some embodiments, the inertial measurement device 50 may include a global positioning system (GPS) receiver 60. In such embodiments, the inertial data may include data generated by the GPS receiver 60 that indicates a geolocation of the signal level meter 40. For example, the inertial measurement device 50 may be a USB inertial measurement device that are commercially available from Robert Bosch LLC. (e.g., Sensortec BN0055 USB Stick), YOST LABS (e.g., 3-Space™ Micro USB), or Yoctopuce (e.g., Yocto-3D). Such USB inertial measurement device 50 includes a microcontroller that acts as an interface to the I/O port 78 of the signal level meter 40.

Figure 3:
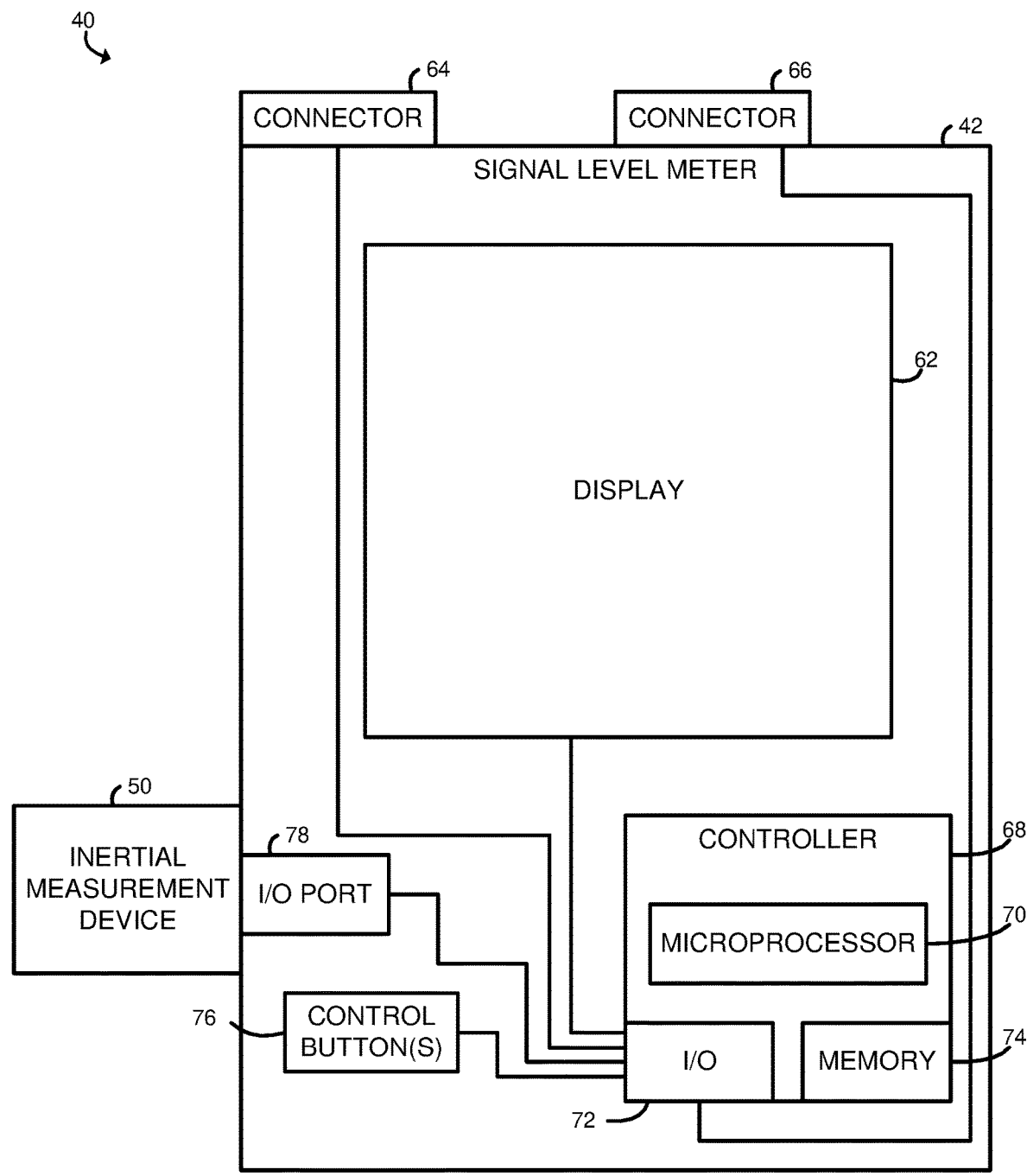
FIG. 3 is a block diagram schematic of the signal level meter of the instrument system of FIG. 1.

Referring now to FIG. 3, the signal level meter 40 includes an outer casing 42 that houses various electronic components for analyzing the signals received via the connector 64 and other connectors, including, for example, the connector 66. In the illustrative embodiment, the signal level meter 40 includes a touchscreen display 62 and various control buttons 76 that may be utilized by the technician to operate the signal level meter 40 and analyze signals received by it. The signal level meter 40 also includes an Input/Output (I/O) port 78 such as, for example, a USB port, that is configured to be connected to the inertial measurement device 50. It should be appreciated that, in some embodiments, the I/O port 78 may be embodied as a wireless port that is wirelessly connected to the inertial measurement device 50 via wireless technology such as, for example, Bluetooth technology.

As described further below, the signal level meter 40 is further configured to analyze data received via the I/O port 78 from an I/O device such as, for example, the inertial measurement device 50. In some embodiments, the signal level meter 40 may also include a speaker or other device operable to generate audible signals.

The signal level meter 40 also includes an electronic control unit (ECU) or "electronic controller" 68, which is configured to control the operation of the signal level meter 40. The electronic controller 68 includes a Digital Signal Processor (DSP), but in other embodiments, the controller 68 may include one or more Field Programmable Gate Arrays (FPGA) and Cable Modem Chips. Each of the components described above (e.g., the display 62, connectors 64, 66, the control buttons 76, the I/O port 78, and so forth) is connected to the electronic controller 68 via a number of communication links such as printed circuit board traces, wires, cables, and the like.

The electronic controller 68 includes, amongst other components customarily included in such devices, a processor such as a microprocessor 70 and a memory device 74 such as a programmable read-only memory device ("PROM") including erasable PROM's (EPROM's or EEPROM's). The memory device 74 is provided to store, amongst other things, instructions in the form of, for example, a software routine (or routines) which, when executed by the microprocessor 70, allows the electronic controller 68 to control operation of the signal level meter 40 (and hence, for example, the antenna assembly 48). In the illustrative embodiment, the memory device 74 has stored therein a number of normalization tables associated with the range of possible drop levels of the subscriber's premises 14 and the range of possible transmit levels of the transmitter assembly 34.

Figure 4:
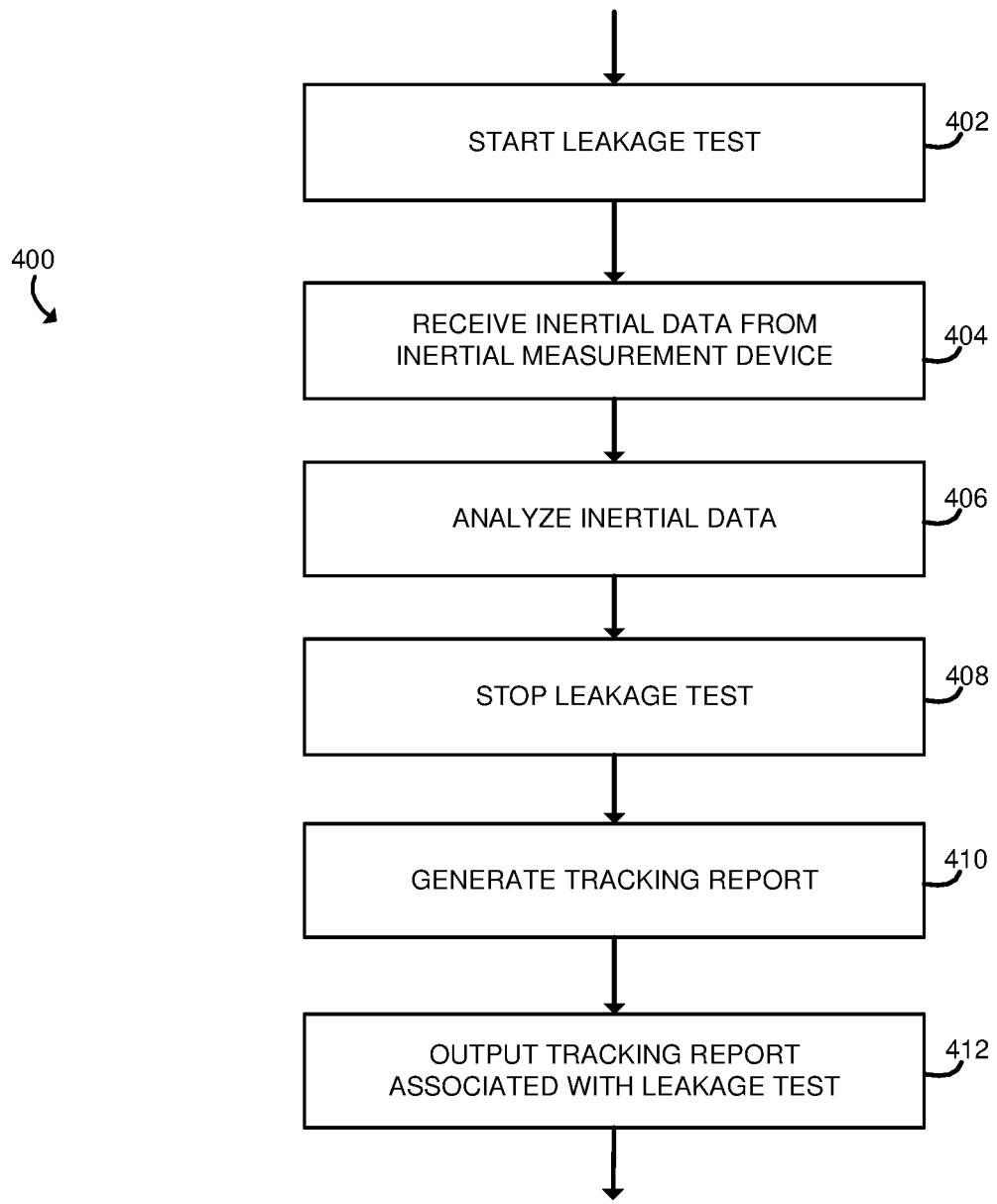
FIG. 4 is a simplified flow diagram of one embodiment of a method of generating a tracking report associated with a leakage test that may be performed by the signal level meter of FIG. 1.

Referring now to FIG. 4, an exemplary procedure 400 for generating a report associated with a leakage test at a subscriber's premises 14 is shown. The procedure 400 begins in block 402 in which the controller 68 of the signal level meter 40 starts a leakage test to determine whether leakage is detected at a subscriber's premises 14. For example, the controller 68 may start the leakage test in response to receiving an indication from the maintenance/service technician to start the leakage test.

Once the leakage test is on, the controller 68 receives the inertial data from the inertial measurement device 50 secured to the signal level meter 40 (e.g., via the I/O port 78 of the signal level meter 40), as indicated in block 404. As described above, during the leakage test, a maintenance/service technician walks around the subscriber's premises 14 monitoring leakage signals detected by the signal level meter 40 to identify flaws in the wiring and network devices at the subscriber's premises 14. Concurrently, the inertial measurement device 50 generates the inertial data during the leakage test. In the illustrative embodiment, the inertial data includes data generated by the accelerometer 56 and the gyroscope 58. In some embodiments, in which the inertial measurement device 50 includes a GPS receiver 60, the inertial data may include data generated by the GPS receiver 60 that indicates a geolocation of the inertial measurement device 50. One example procedure for determining a sensor-based geolocation is shown and described in U.S. Patent App. Pub. No. 2017/0311127, which is incorporated herein by reference in its entirety. It should be appreciated that, in the illustrative embodiment, the controller 68 receives the inertial data and leakage signals simultaneously during the leakage test, which is subsequently analyzed to determine whether a leakage is detected at the subscriber's premises 14.

Subsequently, in block 406, the controller 68 analyzes the inertial data received from the inertial measurement device 50 to determine the motion activity of the inertial measurement device 50. To do so, the controller 68 may determine the orientation and/or angular velocity of the signal level meter 40 based on the inertial data. Based on the motion activity of the inertial measurement device 50, the controller 68 may further determine an activity path (e.g., footsteps) of the maintenance/service technician performing the leakage test throughout the leakage test at the subscriber's premises 14. For example, the controller 68 may determine relative and/or GPS coordinates of the maintenance/service technician's location during the leakage test to determine the activity path.

In block 408, the controller 68 stops the leakage test. For example, the controller 68 may stop the leakage test in response to receiving an indication from the maintenance/service technician to stop the leakage test.

Figure 7:
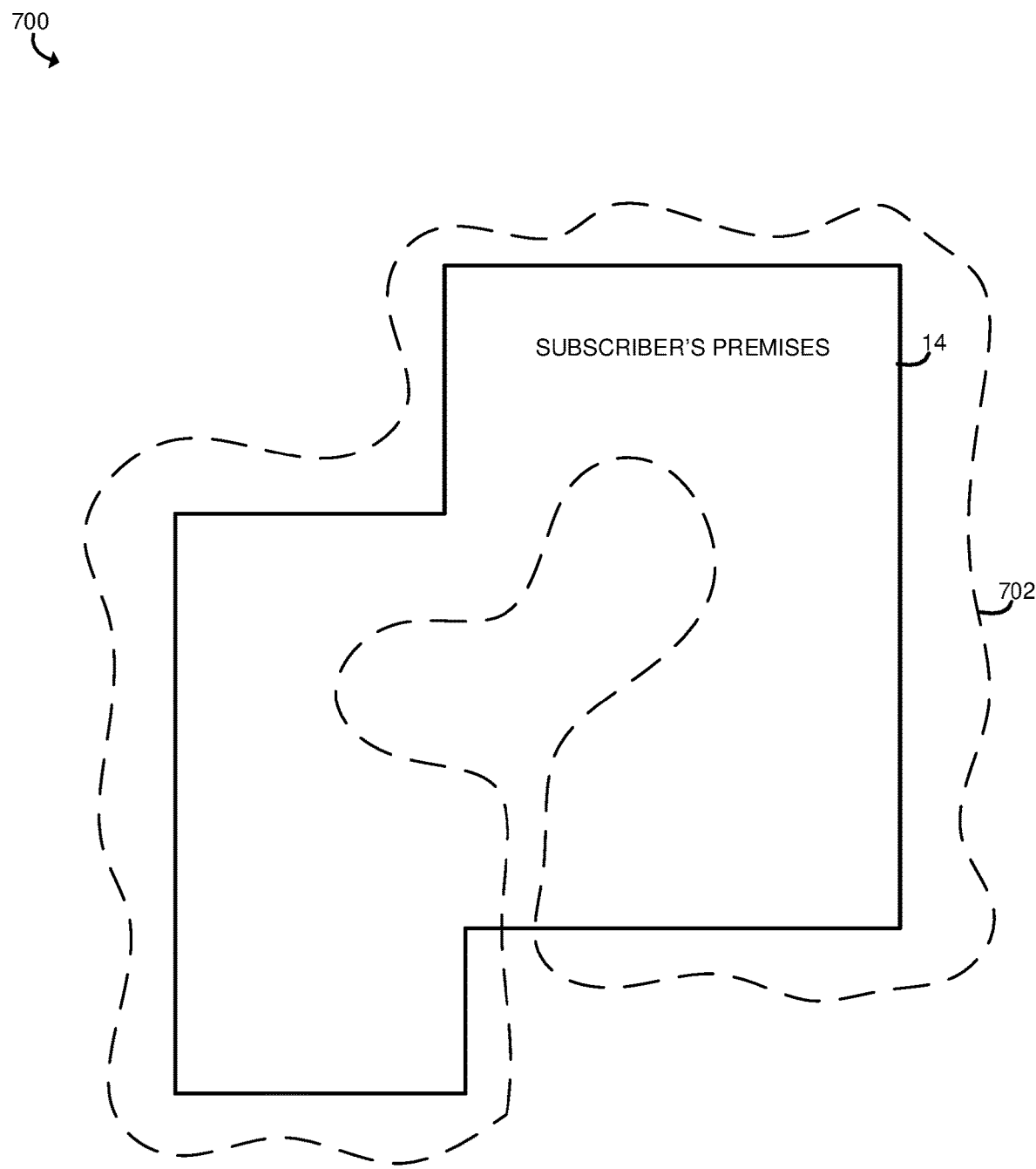
FIG. 7 is an exemplary tracking map illustrating the subscriber's premises and an activity path of a technician performing the leakage test using the signal level meter of FIG. 1 during a leakage test.

Based on the analysis of the inertial data, the controller 68 generates a tracking report associated with the leakage test, as indicated in block 410. The tracking report may include the inertial data, the motion activity of the inertial measurement device 50, and/or the activity path of the maintenance/service technician. In some embodiments, the tracking report may further include a tracking map 700 that depicts the subscriber's premises 14 and the activity path 702. An exemplary map 700 is illustrated in FIG. 7 and is described in greater detail below. It should be appreciated that the tracking report may be used to verify that the maintenance/service technician has performed the leakage test at the subscriber's premises 14 to identify leakage from the cable network system.

Subsequently, the controller 68 outputs the tracking report associated with the leakage test, as indicated in block 412. For example, the controller 68 may transmit the tracking report to a server. Additionally, in some embodiments, the controller 68 may display the tracking report or the tracking map 700 on the display 62 of the signal level meter 40.

It should be appreciated that, in some embodiments, the controller 68 may receive the inertial data and the leakage signals during the leakage test and analyze the entire inertial data and the leakage signals once the technician completes the leakage test (i.e., the leakage test mode has been deactivated).

Figure 5:
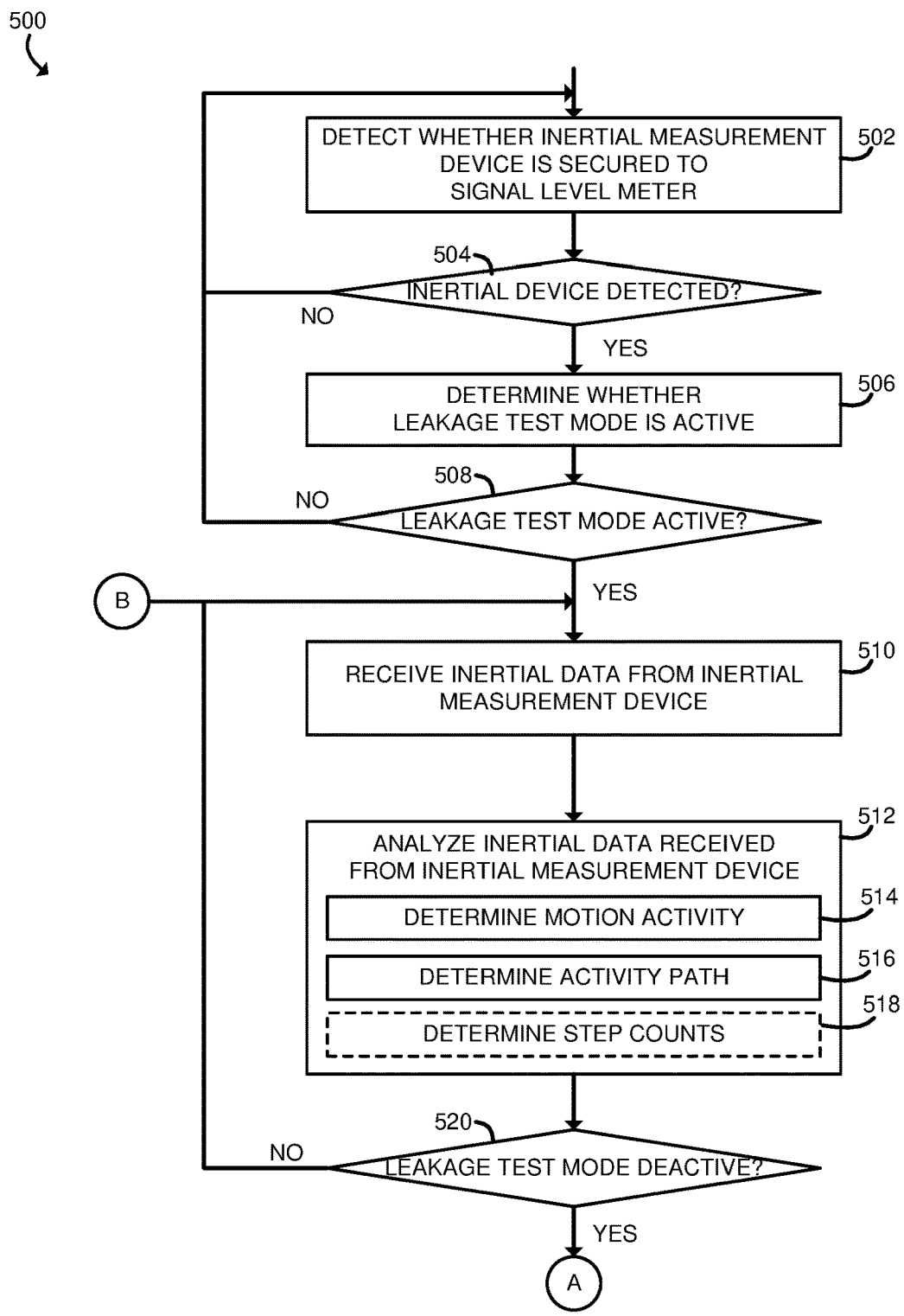
FIGS. 5 and 6 are simplified flow diagrams of a detailed embodiment of a method of generating a tracking report associated with a leakage test that may be performed by the signal level meter of FIG. 1.
Figure 6:
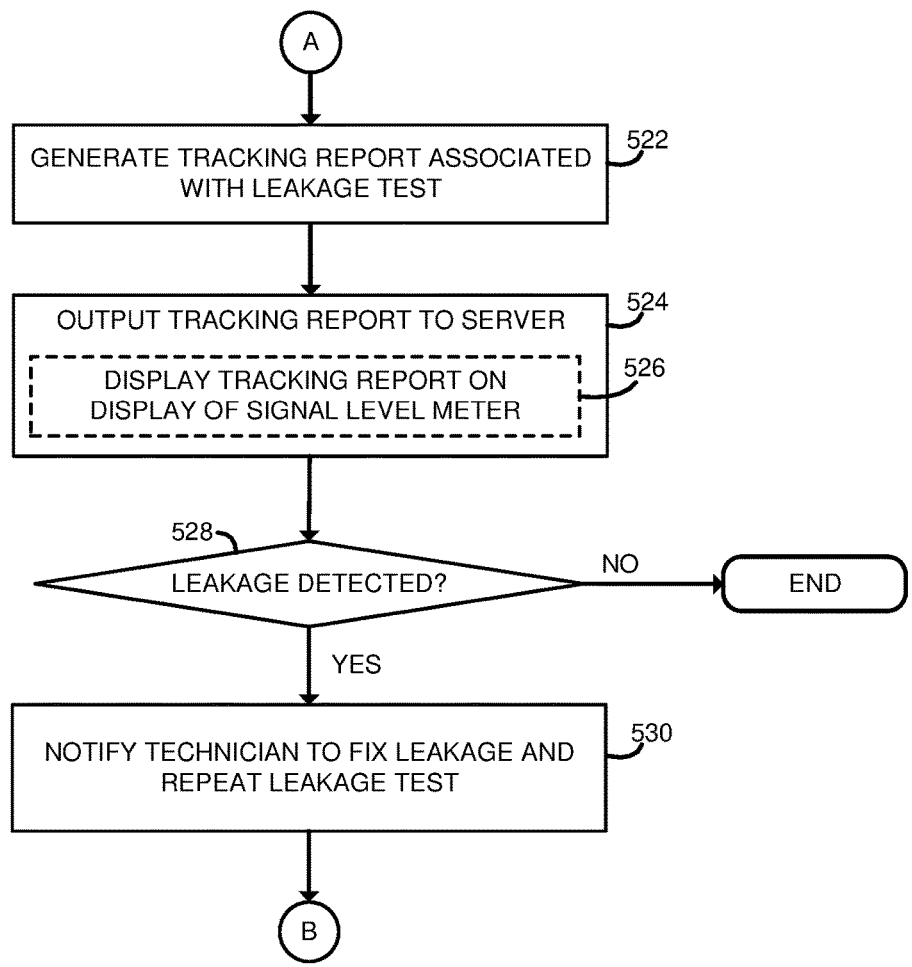

Referring now to FIGS. 5 and 6, an exemplary procedure 500 for generating a report associated with a leakage test at a subscriber's premises 14 is shown. The procedure 500 begins in block 502 in which the controller 68 of the signal level meter 40 detects whether an inertial measurement device 50 is connected to the signal level meter 40. Specifically, in the illustrative embodiment, the controller 68 determines whether the inertial measurement device 50 is connected to the I/O port 78 of the signal level meter 40. If the controller 68 determines that the inertial measurement device 50 is not connected in block 504, the procedure 500 loops back to block 502 to continue detecting the presence of an inertial measurement device 50. If, however, the controller 68 determines that the inertial measurement device 50 is connected, or otherwise coupled, to the signal level meter 40 in block 504, the procedure 500 advances to block 506.

In block 506, the controller 68 determines whether a leakage test mode is active. For example, the controller 68 determines whether the maintenance/service technician turned on the leakage test mode on the signal level meter 40 by pressing one of the control buttons 76 to start the leakage test. If the leakage test mode is not active, the procedure 500 loops back to block 502. If, however, the controller 68 determines that the leakage test mode is active in block 508, the procedure 500 advances to block 510. It should be appreciated that blocks 502-508 may be performed in block 402.

Once the leakage test mode is active, in block 510, the controller 68 receives leakage signals detected by the signal level meter 40 and inertial data from the inertial measurement device 50. As described above, the inertial data may include data generated by the accelerometer 56 and the gyroscope 58. In some embodiments, the inertial measurement device 50 may include a GPS receiver 60. In such embodiments, the inertial data may include data generated by the GPS receiver 60 indicative of a geolocation of the signal level meter 40. It should be appreciated that block 510 may be performed in block 404.

Subsequently, in block 512, the controller 68 analyzes the inertial data received from the inertial measurement device 50. For example, in the illustrative embodiment, the controller 68 determines a motion activity of the inertial measurement device 50, as indicated in block 514. To do so, the controller 68 determines the orientation and angular velocity of the inertial measurement device 50 based on the inertial data received from the accelerometer 56 and the gyroscope 58 of the inertial measurement device 50. Based on the motion activity of the inertial measurement device 50, the controller 68 further determines an activity path of the maintenance/service technician, as indicated in block 516. The activity path tracks coordinates (e.g., relative or GPS coordinates) of the locations of the maintenance/service technician throughout the leakage test at the subscriber's premises 14. Additionally, in some embodiments, the controller 68 may determine a number of steps that the maintenance/service technician has taken along the activity path during the leakage test, as indicated in block 518. It should be appreciated that blocks 512-518 may be performed in block 406.

In block 520, the controller 68 determines whether the leakage test mode is deactivated. For example, the controller 68 determines whether the maintenance/service technician turned off the leakage test mode by pressing one of the control buttons 76 to stop the leakage test. If not, the procedure 500 loops back to block 510 to continue receiving the inertial data from the inertial measurement device 50. If, however, the controller 68 determines that the leakage test mode has been deactivated, the procedure 500 advances to block 522 of FIG. 6. It should be appreciated that block 520 may be performed in block 408.

In block 522, the controller 68 analyzes the inertial data to generate a tracking report associated with the leakage test. In the illustrative embodiment, the tracking report includes the inertial data, the motion activity of the inertial measurement device 50, and the activity path of the maintenance/service technician. Additionally, the tracking report may also include the number of steps that the maintenance/service technician taken during the leakage test. In some embodiments, the activity path may be illustrated as a tracking map 700, which indicates the footsteps of a maintenance/service technician walking around the subscriber's premises 14 during the leakage test, as illustrated in FIG. 7 in a dotted line 702. As such, the tracking report may be used to verify that the maintenance/service technician has performed the leakage test at the subscriber's premises 14. It should be appreciated that, in some embodiments, the tracking report may also include leakage information based on the leakage signals received during the leakage test. In such embodiments, the tracking report may indicate the location of the detected leakage from the cable network system at the subscriber's premises.

As described above, in some embodiments, the controller 68 may receive the inertial data during the leakage test and analyze the entire inertial data once the technician completes the leakage test (i.e., the leakage test mode has been deactivated). It should also be appreciated that block 522 may be performed in block 410.

Subsequently, in block 524, the controller 68 outputs the tracking report to a server. In some embodiments, the controller 68 may display the tracking report on the display 62 of the signal level meter 40, as indicated in block 526. In some embodiments, the server may support a cloud operating environment for communication between the signal level meter 40 and a cable network provider. This allows the signal level meter 40 to transmit the tracking report associated with the leakage test to the cable network provider for documentation and/or further analysis. In other embodiments, the server may provide services to subscribers of the cable network system to view the tracking report of the leakage test at their premises. It should be appreciated that blocks 524-526 may be performed in block 412.

Additionally, if the controller 68 determines that leakage has been detected during the leakage test in block 528, the controller 68 notifies the maintenance/service technician to fix the leakage and repeat the leakage test as indicated in block 530. For example, the controller 68 may display a notification on the display 62 of the signal level meter 40 and/or play an audible notification message. Subsequently, the procedure 500 loops back to block 510 to start another leakage test. If, however, the controller 68 determines that leakage has not been detected in block 528, the procedure 500 ends.

Referring now to FIG. 7, an exemplary tracking map 700 that depicts the subscriber's premises 14 and the activity path 702 of the maintenance/service technician is shown. As discussed above, the controller 68 of the signal level meter 40 may generate a tracking map to illustrate the footsteps of the maintenance/service technician throughout the leakage test. To do so, in the illustrative embodiment, the controller 68 overlaps the relative coordinates of the activity path 702 onto a map of the subscriber's premises 14. It should be appreciated that the map of the subscriber's premises 14 may be stored in the memory device 74 of the signal level meter 40 or received from the server. In some embodiments, in which the inertial measurement device 50 includes the GPS receiver 60, the controller 68 may generate the tracking map using the GPS coordinates received from the GPS receiver 60. If the map of the subscriber's premises is not available, the controller 68 may generate the tracking map that depicts only the activity path 702 of the maintenance/service technician.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. An instrument system comprising:
a first instrument operable to generate inertial data, and
a second instrument secured to the first instrument during a leakage test, wherein the second instrument includes a controller operable to:
receive inertial data from the first instrument,
analyze the inertial data, wherein to analyze the inertial data comprises to determine an activity path of a technician performing the leakage test based on the motion activity of the first instrument,
generate a tracking report associated with the leakage test, the tracking report indicating a motion activity of the first instrument based on the inertial data, wherein to generate the tracking report comprises to generate a tracking map illustrating the activity path of the technician during the leakage test, wherein the tracking map includes locations of the technician relative to a subscriber's premises where the leakage test is being performed, and
output the tracking report associated with the leakage test, wherein to output the tracking report comprises to display the tracking map on a display screen of the second instrument.

2. The instrument of claim 1, wherein the second instrument further includes an input/output (I/O) port, wherein the first instrument is secured to the second instrument via the I/O port.

3. The instrument of claim 1, wherein the second instrument further includes a wireless port to receive the inertial data from the first instrument.

4. The instrument of claim 1, wherein the first instrument includes at least one of an accelerometer, a gyroscope, and a global positioning system (GPS) receiver.

5. The instrument of claim 1, wherein to analyze the inertial data comprises to determine at least one of an orientation and an angular velocity of the first instrument.

6. The instrument of claim 5, wherein to analyze the inertial data comprises to determine the motion activity of the first instrument based on at least one of the orientation and the angular velocity of the first instrument.

7. The instrument of claim 1, wherein to analyze the inertial data comprises to determine a number of steps taken by a technician performing the leakage test during the leakage test.

8. The instrument of claim 1, wherein the tracking report includes at least one of the inertial data, the motion activity of the first instrument, and the activity path of the technician.

9. The instrument of claim 1, wherein the controller is further operable to detect a leakage at a subscriber's premises during the leakage test and to notify, in response to detecting the leakage, a technician to fix the leakage and repeat the leakage test.

10. A method comprising:
receiving, by an instrument, inertial data from an inertial measurement device during a leakage test,
analyzing, by the instrument, the inertial data, wherein analyzing the inertial data comprises determining an activity path of a technician performing the leakage test based on the motion activity of the inertial measurement device,
generating, by the instrument, a tracking report associated with the leakage test, the tracking report indicating a motion activity of the inertial measurement device based on the analysis of the inertial data, wherein generating the tracking report comprises generating a tracking map illustrating the activity path of the technician during the leakage test, wherein the tracking map includes locations of the technician relative to a subscriber's premises where the leakage test is being performed, and outputting the tracking report associated with the leakage test, wherein outputting the tracking report comprises displaying the tracking map on a display screen of the instrument.

11. The method of claim 10, wherein receiving the inertial data from the inertial measurement device comprises receiving the inertial data from the inertial measurement device secured to the instrument.

12. The method of claim 11, wherein the inertial measurement device is secured to the instrument via an input/output (I/O) port of the instrument.

13. The method of claim 10, wherein receiving the inertial data from the inertial measurement device comprises receiving the inertial data wirelessly from the inertial measurement device.

14. The method of claim 10, wherein the inertial measurement device includes at least one of an accelerometer, a gyroscope, and global positioning system (GPS) receiver.

15. The method of claim 10, wherein the inertial data indicates at least one of an orientation and an angular velocity of the instrument.

16. The method of claim 15, wherein analyzing the inertial data comprises determining at least one of the orientation and the angular velocity of the inertial measurement device based on the inertial data.

17. The method of claim 16, wherein analyzing the inertial data comprises determining the motion activity of the inertial measurement device based on at least one of the orientation and the angular velocity of the inertial measurement device.

18. The method of claim 10, wherein analyzing the inertial data comprises determining a number of steps taken by a technician performing the leakage test during the leakage test.

19. The method of claim 10, wherein the tracking report includes at least one of the inertial data, the motion activity of the first instrument, and the activity path of the technician.

20. The method of claim 10, further comprising:
detecting, by the instrument, a leakage at a subscriber's premises during the leakage test, and notifying, in response to detecting the leakage, a technician to fix the leakage and repeat the leakage test.

* * * * *